United States Patent [19]

Cutler

[11] Patent Number: 4,828,584
[45] Date of Patent: May 9, 1989

[54] DENSE, FINE-GRAINED TUNGSTEN CARBIDE CERAMICS AND A METHOD FOR MAKING THE SAME

[75] Inventor: Raymond A. Cutler, Salt Lake City, Utah

[73] Assignee: Ceramatec, Inc., Salt Lake City, Utah

[21] Appl. No.: 817,427

[22] Filed: Jan. 9, 1986

[51] Int. Cl.$^4$ ............................................. C04B 35/56
[52] U.S. Cl. ....................................... 51/307; 75/240; 75/242; 501/87
[58] Field of Search .............. 501/87; 51/307; 75/240, 75/242

[56] References Cited

U.S. PATENT DOCUMENTS

| | | | |
|---|---|---|---|
| 4,126,652 | 11/1978 | Oohara et al. ......................... | 501/87 |
| 4,146,379 | 3/1979 | Copley et al. ......................... | 501/87 |
| 4,162,301 | 7/1979 | Hanling ................................. | 501/87 |
| 4,256,496 | 3/1981 | Brandstater ........................... | 501/87 |

Primary Examiner—Mark L. Bell
Attorney, Agent, or Firm—Trask, Britt, & Rossa

[57] ABSTRACT

A tungsten carbide ceramic material which cuts titanium alloys four to five times faster than cemented carbide, ceramic-coated cemented carbides, or state-of-the-art ceramic cutting tools can be densified with or without applied pressure at temperatures below 1700° C. Grain growth inhibitors or sintering aids can be added to control grain size in the final product. The polycrystalline tungsten carbode ceramic can be formed into wear components having improved performance in comparison to cemented tungsten carbides in a variety of drilling, cutting, milling, and other wear applications.

5 Claims, No Drawings ered by this invention is a dense, fine-grained tungsten carbide ceramic body...

DENSE, FINE-GRAINED TUNGSTEN CARBIDE CERAMICS AND A METHOD FOR MAKING THE SAME

BACKGROUND OF THE INVENTION

1. Field

This invention relates to the field of ceramics and particularly to dense, polycrystalline tungsten carbide (WC) bodies.

2. Description of the Prior Art

In the early 1900's WC was densified by heating this ceramic to temperatures near 2000° C., but the WC was far too brittle to make an acceptable cutting tool. Schroter initiated work in 1914 to make cemented carbides, which are composites which combine an abrasive ceramic (carbide phase) with a ductile metal (i.e., Co, Ni, Fe, etc.) by sintering the powder composite at temperatures above the melting point of the metallic phase. These ceramic-metal composites are also called by the acronym "cermets" and were designed to combine the abrasive properties of the carbide phase with the ductility of the metallic component. Cemented carbides, particularly WC-Co cermets, have been used extensively in metal cutting applications since 1927.

In order to increase the cutting speed, and hence the cutting efficiency, cutting tools of essentially pure ceramics (ceramics are inorganic, nonmetallic materials; particularly oxides, carbides, nitrides, borides, etc.) without metal additives, or with minor metallic additives introduced during the milling process, have been used since the introduction of $Al_2O_3$ in the 1950's. The cutting speed has continually increased as $Al_2O_3$-TiC, SiAlON, $Si_3N_4$, and SiC whisker-reinforced $Al_2O_3$ ceramic cutting tools have been introduced into the market place. Cutting speeds as high as 25 surface meters per second (m/s) have been reported, and speeds between 5 and 15 m/s are routinely achieved with such essentially pure ceramics (i.e., low metallic impurities), whereas even ceramic-coated cemented carbides are generally limited to speeds below 7 m/s. The deformation of the metallic phase in the cermets at temperatures as low as 600° C. generally limits the cutting speed for the cemented carbides.

In general, an acceptable cutting tool has room temperature toughness greater than 4 MPa-m$^{\frac{1}{2}}$, flexural strength greater than 400 MPa, hardness greater than 15 GPa, and thermal conductivity greater than 20 W/mK. The above properties are minimum values and higher values are desirable. High toughness, strength, and thermal conductivity lead to tools with improved resistance to chipping, and thereby enable one to make interrupted cutting when metal machining. Cemented carbides used in drilling applications have toughness values in excess of 8 MPa-m$^{\frac{1}{2}}$. Higher hardness correlates with improved wear resistance, although chemical compatibility is essential for good performance. Since temperatures in metal cutting applications reach 1000°-1200° C. at the tool-work piece interface, it is important to retain hardness and toughness at high temperatures. The greater efficiency of many ceramics, as compared to cemented carbides (i.e., cermets), is that they maintain wear resistance (i.e., hardness) and strength at elevated temperatures.

The toughness of ceramics are generally below that of cemented carbides, and those ceramics with toughness values approaching 8 MPa-m$^{\frac{1}{2}}$ (i.e., $Si_3N_4$ and SiC whisker-reinforced $Al_2O_3$) have poor thermal conductivity as compared to cemented carbides. Since high toughness and thermal conductivity are required to perform well in interrupted cutting or drilling applications, it would be desirable to find ceramics with improved toughness and thermal conductivity.

Despite the improved performance in metal machining operations due to the advent of ceramic-coated cemented carbides and ceramics, there are still applications where machining is still very slow. An excellent example is the machining of titanium alloys. Machining is normally accomplished with cemented tungsten carbide tools (1-5 micrometer WC grain size) with five to six weight percent cobalt made by conventional liquid phase sintering at temperature near 1400° C. in vacuum or hydrogen. Machining speeds for such tools are between 1.0 and 1.5 surface meters per second when machining titanium with depths of cut between 0.20 and 0.26 millimeters per revolution. This is very slow compared to machining of other metals and represents a barrier that many tool developers have sought to overcome. Numerous cemented carbides, ceramic-coated cemented carbides, and available ceramics have all been tested without success in order to find a cutting tool that can machine titanium alloys at higher speeds than WC-Co tools.

There is widespread disagreement on the thermal conductivity of essentially pure WC, with values ranging between 30 W/mK (as reported in *Transition Metal Carbides and Nitrides* by L. E. Toth (Academic Press, London, 1971)) to 121 W/mK (as reported by Kieffer and Benesovsky in *Encyclopedia of Chemical Technology*, 3rd Edition 490-505 (1978)). When Batelle Columbus Labs published their *Engineering Property Data on Selected Ceramics Vol. 2, Carbides* in 1979 they stated that "limited and questionable thermal conductivity data of WC were not considered worthy of inclusion".

Data on the fracture toughness of WC in the absence of Co are sparse in spite of extensive data for cemented carbides. It is also not recognized that the fracture toughness of tungsten carbide, in the absence of metallic binding phases, is suitable for cutting applications. Chermant, et al. (*Fracture Mechanics of Ceramics, Vol 4* edited by R. C. Bradt, D. P. H. Hasselman, and F. F. Lange, Plenum Press, New York, 891-901 (1978)) upon reporting a fracture toughness of 7.5 MPa-m$^{\frac{1}{2}}$ for WC said that the value is very low.

It is well documented that WC has excellent hardness at temperatures to 1000° C. as reported by Westbrook and Stover (*High-Temperature Materials and Technology* edited by I. E. Campbell and E. M. Sherwood, Wiley, New York, 312 (1967)). While the hardness of WC is approximately 18 GPa at room temperature, which is significantly lower than TiC (approximately 30 GPa), it is approximately 12 GPa at 1000° C., which is much higher than TiC (approximately 4 GPa). The limitation of WC is that it oxidizes readily, but its utility in cutting tools would be possible due to its ability to transport heat away from the cutting tool tip assuming it has high thermal conductivity. Dense WC ceramics with high thermal conductivity, fracture toughness values approaching 8 MPa-m$^{\frac{1}{2}}$, and high hot hardness are expected to find utility in a wide range of applications requiring wear resistance and high toughness at low temperatures (less than 300° C.) for extended periods of time (hours), or where short excursions to high temperatures (less than 1200° C.) are required.

Foster, et al. (J. Am. Ceram. Soc., 33 1, 27–33 (1950)) showed that it was possible to sinter WC with Co, Ni, CoO, or NiO additions as small as 0.25 wt. %. Due to their high sintering temperature (2000°–2500° C.) substantial grain growth occurred during sintering, resulting in low hardness due to large WC grains (WC grains between 15 and 30 micrometers are evident in their microstructures). In addition, their long milling times (100–264 hours) in a WC-Co lined mill with cemented carbide media, certainly added excess liquid phase to promote sintering. Meredith and Milner (Pow. Met., 1, 38–45 (1976)) reported on the activated sintering of WC using Co additions up to 1 volume percent but failed to reach closed porosity. Other investigators (see Schwarzkopf, *Refractory Hard Metals*, MacMillan Co., New York 1953) have found that Ni or Fe additions of less than 1 volume percent promote sintering but no one has been able to densify WC without external pressure, even with additions of up to 1 volume percent metal, to closed porosity so that hot isostatic pressing is possible, and retain a microstructure which is suitable for commercial cutting and wear applications. It is also not recognized that tungsten carbide, in tne absence of impurities, densifies well by solid state sintering. Meredith and Milner found no densification of WC without Co additions during their investigation of enhanced sintering at temperatures up to 1400° C.

In recognition of the interest in increasing the machining rate of titanium alloys and making ceramics with improved toughness and thermal conductivity, it would be a major innovation and improvement in the art to develop ceramics which readily machine titanium and can be used in other applications where high wear resistance and fracture toughness are required.

SUMMARY OF THE INVENTION

Cutting tools and wear parts composed essentially of dense, fine-grained, polycrystalline, tungsten carbide (WC) have been invented. These components are made by ceramic processing techniques and result in a ceramic body which is at least 98.5% by volume WC, and has a density of greater than 95% of theoretical density (15.77 g/cc), with substantially all grains having an average size of less than about 15 micrometers, with average grain sizes being preferably less than about ten micrometers and especially less than five, with a grain size range of about 0.1 to about 5.0 micrometers being particularly useful.

The ceramic articles of this invention are particularly useful as wear parts, especially as cutting tools for machining titanium metals and alloys of titanium which have a very high content of titanium.

The method of making WC ceramic articles of this invention having at least 98.5% by volume WC present involves forming a green body (i.e., unsintered ceramic) of very fine WC particles (particles having an average diameter of less than 15 micrometers and preferably less than 5 micrometers) and sintering at a temperature and for a time sufficient to densify said particles into a tough, hard, WC ceramic having fine grains. If the sintering is performed at too high a temperature or for too long a time, grain growth will occur resulting in a WC ceramic which will not have requisite properties for cutting tools or wear parts.

OBJECTS OF THE INVENTION

It is the primary object of this invention to make a ceramic material which has high toughness and thermal conductivity and that can machine titanium alloys at a much higher rate than prior art cutting tools.

It is another object of the present invention to make dense, polycrystalline tungsten carbide where the grain size is between 0.1 and 15 micrometers in diameter.

It is yet another object of the invention to control the grain size of the tungsten carbide by adding inert second phase refractory oxides, carbides, nitrides, or borides.

It is yet another object of the invention to disclose methods for densifying WC at temperatures below 1700° C.

DESCRIPTION OF THE PREFERRED EMBODIMENTS

Tungsten carbide ceramics of the instant invention can be tailored for specific applications by controlling the grain size. High toughness (8 MPa-m$^{\frac{1}{2}}$) is attained for grain sizes between 5 and 15 micrometers, while higher strength and lower toughness (6 MPa-m$^{\frac{1}{2}}$) is achieved in fine-grained materials (sintered average grain size of about 1–3 microns). The fracture mode changes from intergranular to transgranular failure as the grain size increases.

Grain size can be controlled by very careful control of the processing conditions, especially sintering conditions, and by adding a small amount of a second phase which inhibits grai growth. Suitable grain growth inhibitors must be compatible with WC. The free energy of oxides used as grain growth inhibitors must be lower than $WO_2$ and $WO_3$ (i.e., $Al_2O_3$, $ZrO_2$, $TiO_2$, NbO, $NbO_2$, $Nb_2O_5$, $Cr_2O_3$, MgO, $SiO_2$, $Ta_2O_3$, MnO, ZnO, $ThO_2$, BeO, etc.). Suitable carbides for controlling grain size must have free energies of formation less than WC (i.e., VC, $ThC_2$, $Cr_{23}C_6$, ZrC, TiC, SiC, $Cr_3C_2$, etc.). Nitrides used as grain growth inhibitors must have free energies of formation less than $WN_2$ and WN (i.e., ZrN, TiN, $Th_3N_4$, AlN, BN, NbN, VN, $Si_3N_4$, CrN, $Cr_2N$, etc.). Similarly, borides must have free energies of formation less than $WB_2$, WB, and $W_2B_5$ (i.e., $ZrB_2$, $TiB_2$, etc.). Such grain growth inhibitors are present as less than 1.5% by volume of the ceramic body with quantities less than 1 vol. % being preferred.

In all of the above illustrations, it is necessary to realize that other interactions may also occur. For example, the addition of TiC, TiN, or TiO promotes the formation of cubic WC in solid solution with TiC, TiN, or TiO and therefore changes the microstructure. Additionally, little phase diagram work has been done on these systems and therefore knowledge of liquid phases which may promote densification is sparse.

Hot pressing of essentially pure WC powders at temperatures less than 1700° C. and pressures of 35 MPa has resulted in polycrystalline tungsten carbide bodies which are greater than 98.5% of theoretical density. Also, significant densification (linear shrinkages of 9%) has been observed for essentially pure but agglomerated WC powders sintered without external pressure at 1600° C. for 30 minutes in Ar. Such significant solid state sintering occurs in the absence of additives, although small percentages (less than 1 volume percent) of $ZrO_2$ and/or Co resulted in the attainment of closed porosity by pressureless sintering and near theoretical density (greater than 98% of theoretical density) when such powders containing very small amounts of such additives were hot pressed at temperatures between 1400° and 1700° C. Sintering at temperatures of about 1300° C. to 1600° C. results in a fine-grained microstructure with isolated pores.

The testing of dense WC ceramics of this invention having greater than 98.5% by vol. WC has been performed on titanium alloys and has shown substantial increase in performance (four to five times the cutting speed of state-of-the-art tools). The tools were tested with a positive rake gometry rather than the negative rake normally used for ceramics showing that the WC had excellent toughness as compared to conventional ceramics.

It is expected that the very high content WC ceramic cutting tools of this invention will also show improved performance in the machining of ferrous alloys due to their increased toughness and thermal conductivity as compared to conventional ceramic cutting tools, and their ability to resist higher temperatures as compared to cemented carbides, e.g., WC-Co, where Co is intentionally process. While the toughness of the high WC content ceramic bodies of this invention in absence of second phase toughening particles (i.e., whiskers or particulates) may not be high enough to allow the ceramic to perform well in drilling applications, the properties of such ceramics are very suitable for wear applications (i.e., nozzles, seals, liners, and the like). Furthermore, tne addition of a second phase to these improved WC ceramic bodies results in improved toughness so that drilling inserts can be made from these ceramics. The following examples further illustrate the invention.

EXAMPLE 1

Commercially available WC (480 grams of Type IV WC from Teledyne Wah Chang, Huntsville, Ala.) having a total carbon of 6.13% (free carbon of 0.03%) and having less than the following impurities given in weight percent: 0.01% Co, 0.01% Cr, 0.025% Fe, 0.01% Mo, 0.008% Ni and 0.009% O was milled in a stainless steel mill for 24 hours with 3 kg. WC-Co balls in 500 ml n-hexane. The powder picked up less than 0.40 volume % (0.22 wt. %) Co during milling. After drying, the powder was hot pressed at 1625° C. for 10 minutes in Ar at 35 MPa in a graphite die. The density was 15.22 g/cc or 98.0% of theoretical density after hot pressing and the average grain size was 2.7 micrometers as determined by optical microscopy, with all grains being less than 5 micrometers in diameter. This WC ceramic had a hardness of $17.4 \pm 0.48$ GPa and a fracture toughness of $7.01 \pm 0.32$ MPa-m$^{\frac{1}{2}}$ as determined by diamond indentations at 100 to 200 N loads.

The dense WC ceramic was diamond ground into RPG 43 cutting tools and tested in comparison with Kennametal K-68 (commercially available WC-5.8Co) cutting tools on Ti-6Al-4V at speeds of 1-7 m/s (200-1500 sfpm) at a depth of cut of 0.64 mm and feed rate of 0.25 mm/rev. Tne WC ceramic cutting tools prepared via the present example cut the titanium alloy with an acceptable surface finish over the entire range of speeds tested (1-7 m/s), with best performance in the 1.5 to 5.0 m/s range. The conventional WC-Co cutting tool (K-68) showed acceptable performance only between 1.0 and 1.5 m/s. These tests were repeated and another commercial WC-Co cutting tool typically used (Carboloy grade 883 (WC-6Co)) for machining titanium alloys was included in the test. The tests were run until similar wear scars were observed. The WC ceramic of the present invention, cutting at 7 m/s, cut 7 times longer than grade 883, and 3-4 times longer than grade K-68. The WC ceramic of the present invention was the only material to show acceptable surface finish on the titanium alloy at machining speeds of 7 m/s.

EXAMPLE 2

The same powder as prepared in Example 1 was lubricated by adding 2 wt. % paraffin and the powder was compacted at 250 to 500 MPa uniaxially. The paraffin was removed by heating to 400° C. in Ar and the WC was sintered to closed porosity by heating to 1600° C. without applied pressure in Ar and holding for 30 minutes. The bars exhibited between 13 and 18% linear shrinkage (higher shrinkage for lower compacting pressures, as expected) and had strengths of 400 MPa. Hot isostatic pressing at temperatures between approximately 1300° C. and 1600° C. at pressures of approximately 200 MPa of such WC ceramics with closed porosity results in physical properties, i.e., density, hardness, strength, and toughness, equal to or superior to the same material sintered by hot pressing. This example shows that by the techniques of this invention, WC powders can be pressureless sintered to closed porosity and hot isostatic pressed to result in physical properties similar or superior to tne much more expensive hot pressing approach disclosed in Example 1. Alternatively $N_2$, He, $H_2$ or vacuum sintering will give similar results.

EXAMPLE 3

Tungsten carbide powder of the type used in Example 1 (1,195 grams), unstabilized $ZrO_2$ (4.77 grams DK-1 Daiichi) powder as a "dopant" and 1500 ml n-hexane were milled for 24 hours as in Example 1. Upon drying the content of zirconia was approximately 1 volume percent and the cobalt pick-up during milling was less than 0.4 volume percent. The powder was hot pressed to near theoretical density under the same conditions as described in Example 1. The average grain size was 2.2 micrometers, with all grains being less than 5 micrometers in diameter. The hardness was $19.58 \pm 0.43$ GPa and the fracture toughness was $6.87 \pm 0.28$ MPa-m$^{\frac{1}{2}}$. The higher hardness of this material, as compared to the "undoped" WC described in Example 1, has been concluded to be due to a refinement in the tungsten carbide grain size. This same zirconia-containing powder was hot pressed at 1500° C. under the same conditions as described above with similar properties. It was also demonstrated that the powder could be sintered to closed porosity without external pressure at 1600° C. for 30 minutes (following the technique of Example 2) and that partially stabilized or fully stabilized $ZrO_2$ could be substituted for the unstabilized material used in the present example. Other experiments showed that $Al_2O_3$ additions could be used instead of $ZrO_2$.

The hot pressed $ZrO_2$ doped material described above was ground into RPG 43 cutting tools. Testing of such tools on titanium alloys showed that they performed comparable to WC ceramic cutting tools prepared in Example 1.

EXAMPLE 4

Tungsten carbide powder with an average particle size of 2.6 micrometers and impurity levels as described in Example 1 was hot pressed without milling. The objective was to determine if the material would densify at low temperatures with essentially no Co present (less than 0.01% by wt. Co was present in the WC powder, while the total metallic impurities were less than 0.063% by wt.). Hot pressing at 1700° C. and 35 MPa for 10 minutes in Ar resulted in a material which was 98.5 % of theoretical density and had a hardness of 14.25±0.37 GPa and a fracture toughness of 7.21±0.99 MPa-m$^{\frac{1}{2}}$. The grain size (average grain size of 3.0 micrometers with all grains less than 7 micrometers) was somewhat coarser than either of the previous examples due to the higher hot pressing temperature. This example shows that impurities picked up or intentionally added during milling are not necessary for densification to occur and that a high purity WC ceramic having a fine grain size can be produced without additives provided proper sintering conditions are observed.

Numerous variations and modifications can be made without departing from the invention. For example, milling may be performed with milling balls or rods of SiC, Si$_3$N$_4$, Al$_2$O$_3$, ZrO$_2$, WC, WC-Ni, TiC, TiC-Ni-Mo, or other abrasive media in ceramic mills using the same approach. Slightly higher volume percentages of the iron group metals (Co, Ni or Fe) may still result in acceptable performance when machining titanium provided that the grain size is controlled. A number of oxides, carbides, borides, and/or nitrides can be added in quantities generally less than 1% by vol. to control grain size.

Injection molding, extrusion, slip casting, or other processing methods can be substituted for powder pressing described here. Besides cutting tools, wear parts of various types, i.e., nozzles, valve seats, slurry gates and the like, with improved properties can be made of the WC ceramic of this invention. Accordingly, it should be clearly understood that the form of the invention described above is illustrative only and is not intended to limit its scope.

What is claimed is:

1. A ceramic cutting tool comprising polycrystalline tungsten carbide of at least 98.5% by volume tungsten carbide with a density of at least 95% of its theoretical density, said tungsten carbide having an average grain size of about 1 to about 10 micrometers.

2. The ceramic component of claim 1 wherein said tungsten carbide is present as 99% by volume.

3. The ceramic component of claim 1 wherein a carbide, nitride, oxide and/or boride having a free energy of formation less than that of the respective carbide, nitride, oxide and/or boride of tungsten is present in an amount from about 0.1 to about 1.0% by volume.

4. A ceramic cutting tool comprising polycrystalline tungsten carbide of at least 98.5% by volume tungsten carbide with a density of at least 95% of its theoretical density, said tungsten carbide having an average grain size of about 1 to 10 micrometers wherein an iron group element is present from about 0.1 to about 1.0% by volume.

5. A ceramic cutting tool comprising polycrystalline tungsten carbide of at least 98.5% by volume tungsten carbide with a density of at least 95% of its theoretical density, said tungsten carbide having an average grain size of about 1 to 10 micrometers wherein cobalt is present as about 0.01 to about 0.5% by volume.

* * * * *